INVENTOR
EDWIN G. STAUDE
BY Paul, Paul + Moore
ATTORNEYS

Dec. 10, 1929. E. G. STAUDE 1,738,675
AUTOMATIC BRAKE CONTROL FOR POWER PROPELLED VEHICLES
Filed May 18, 1925 8 Sheets-Sheet 2

INVENTOR
EDWIN G. STAUDE
BY
ATTORNEYS

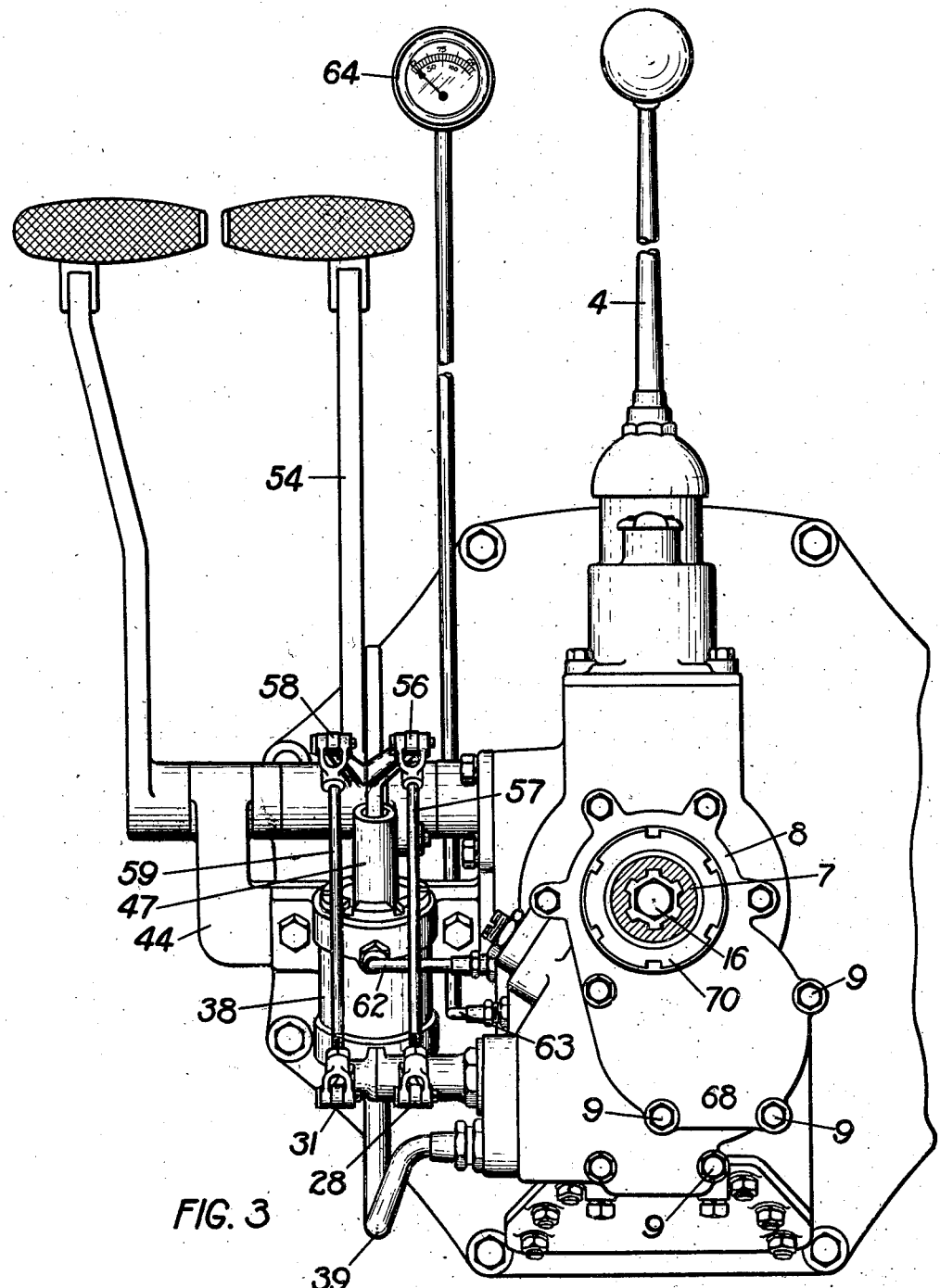

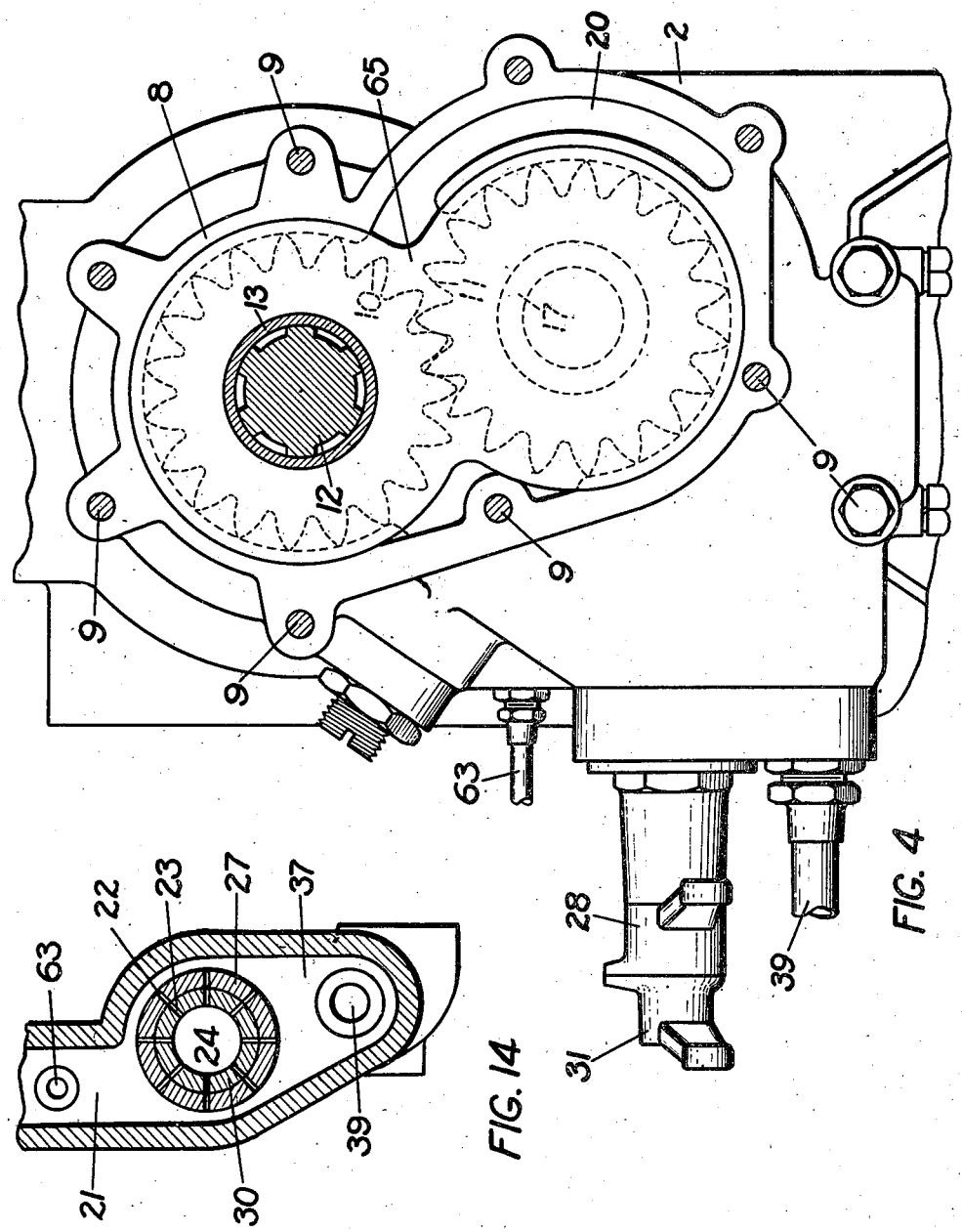

Dec. 10, 1929.  E. G. STAUDE  1,738,675
AUTOMATIC BRAKE CONTROL FOR POWER PROPELLED VEHICLES
Filed May 18, 1925  8 Sheets-Sheet 5

INVENTOR
EDWIN G. STAUDE
BY *Paul, Paul & Moore*
ATTORNEYS

Dec. 10, 1929.  E. G. STAUDE  1,738,675
AUTOMATIC BRAKE CONTROL FOR POWER PROPELLED VEHICLES
Filed May 18, 1925  8 Sheets-Sheet 6

INVENTOR
EDWIN G. STAUDE
BY
ATTORNEYS

Patented Dec. 10, 1929

1,738,675

UNITED STATES PATENT OFFICE

EDWIN G. STAUDE, OF MINNEAPOLIS, MINNESOTA

AUTOMATIC BRAKE CONTROL FOR POWER-PROPELLED VEHICLES

Application filed May 18, 1925. Serial No. 31,084.

This invention relates to improvements in fluid actuated mechanisms for setting and releasing friction brakes usually found on the wheels or transmission shaft of power propelled vehicles, and thereby control the speed of the vehicle.

The mechanism disclosed herein is of the same general character as that described and claimed in my Patent #1,447,908, dated March 6, 1923; Reissue Patent #15,906 of August 26, 1924; and Patent #1,514,804 dated November 11, 1924.

One of the objects of my present invention is to provide an improved valve mechanism which will build up instantaneous pressure with the slightest movement of the foot pedal and release itself immediately when the action of the pressure through its influence on the proper mechanism has moved the various brake linkages through a certain predetermined distance, dependent on the movement of the foot pedal.

A further object is to provide a means of sealing the side wall of the pump case so that the usual packing may be provided without increasing or decreasing the space within which the pump gears revolve.

A further object is to provide a circulating system whereby the exhaust of the pump will be directed into the transmission case, and the intake for the pump come from the transmission case, for the purpose of eliminating air bubbles from the fluid and preventing their formation.

A further object is to provide an outlet relief connection from the space on the opposite side of the piston against which the fluid acts to the transmission case above the fluid line to provide an outlet for the air and such fluid as may seep past the piston and through same into the transmission case, and also to provide a connecting means for replacing the air free from dust or dirt to prevent a vacuum and retard the movement of the piston to its normal position.

A further object is to provide a pressure gauge which will show the actual pressure that is set up by the gear pump and bearing against the piston.

A further object is to provide a simplified manner of mounting one of the pump gears on the transmission shaft and the other pump gears on a lug formed from the wall of the casing.

Other objects of the invention will appear from the following detailed description.

The invention consists generally in various constructions and combinations, all as hereinafter described and particularly pointed out in the claims.

In the accompanying drawings, forming a part of this specification,

Figure 3 is a rear elevation of Figure 1;

Figure 4 is a partial rear view of an automobile transmission to which my invention has been applied and shows the sealing plate which bears against the pump gears, the outside of same being flushed with the surface of the pump case, and the section being taken substantially on the line 4—4 of Figure 5, looking in the direction of the arrow;

Figures 8, 9:
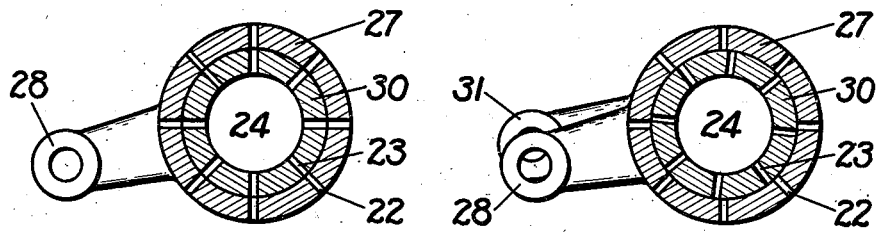
Figures 6, 7:
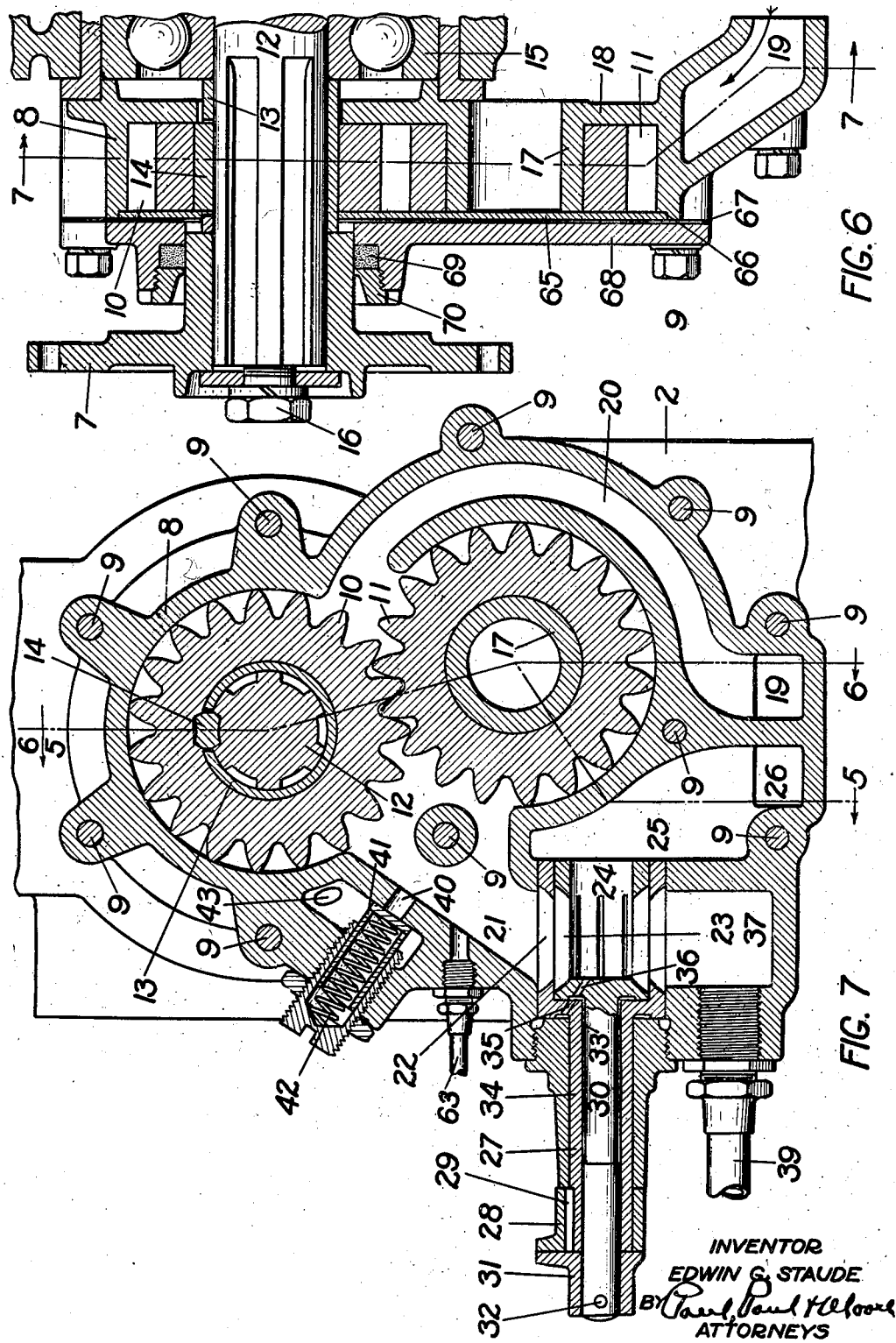
Figure 6 is a similar view, except that the section is taken on the line 6—6 of Figure 7, looking in the direction of the arrow.
Figure 10:
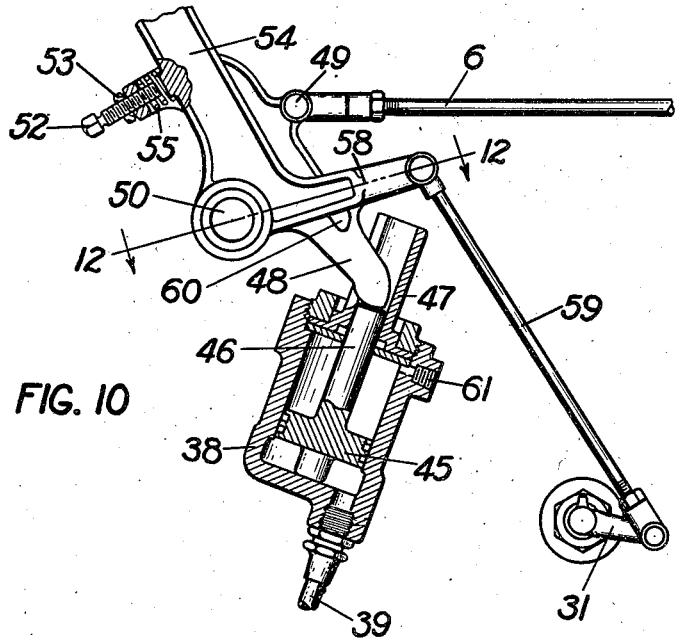
Figure 11:
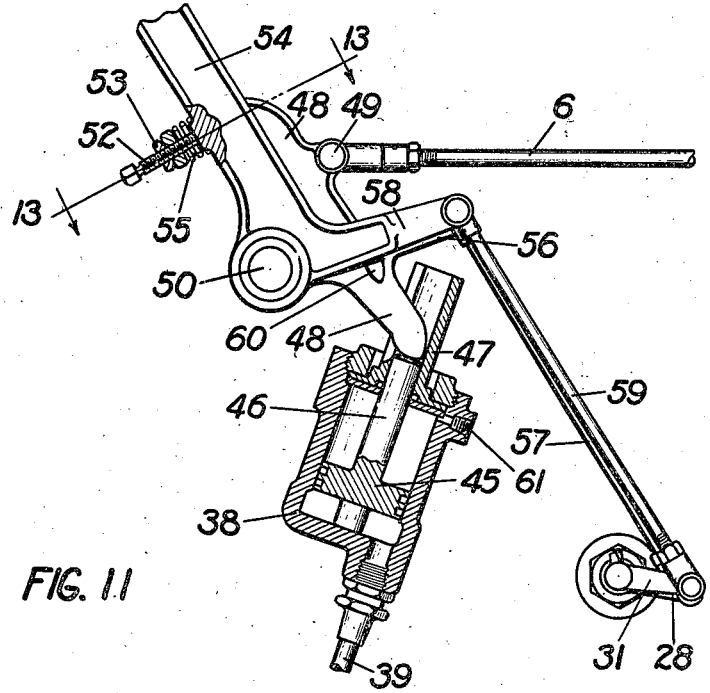
Figure 12:
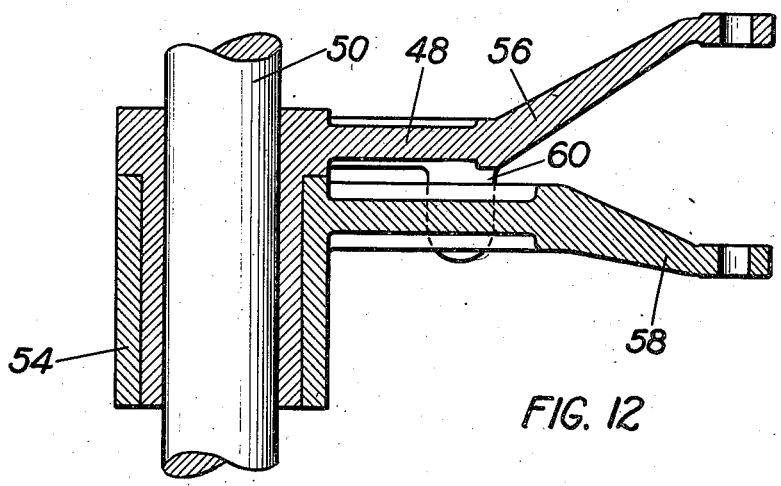
Figure 13:
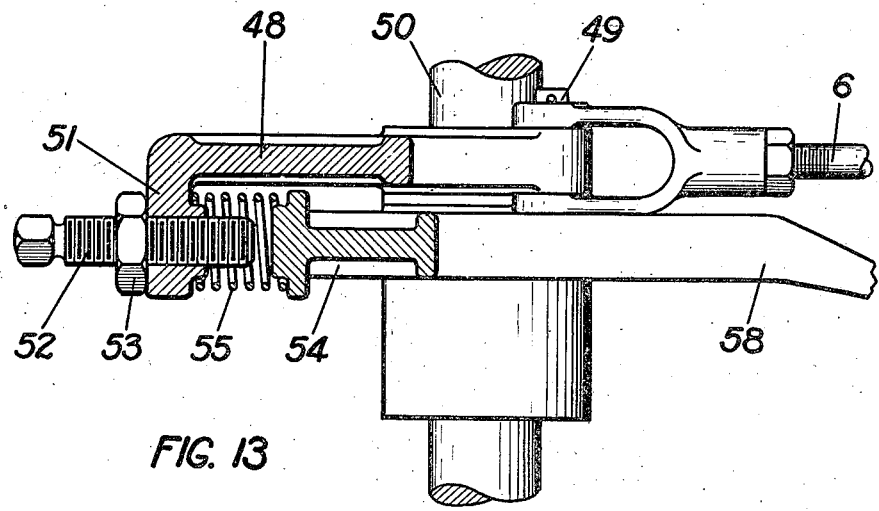

Figure 7 is a cross section on the line 7—7 of Figure 6 and shows the position of the pump gears and the manner of mounting same; also shows the double sleeve rotating control valve in section; also the pressure outlet through which the fluid passes for actuating the piston; also the relief valve which will take care of the overflow pressure and return same to the transmission case; also the fluid inlet into the transmission case and the fluid outlet;

Figure 8 is a cross section detail of the double control valve showing the radial slots through which the fluid passes freely into the center core;

Figure 9 is a similar view, but showing the outer sleeve rocked sufficiently to close the ports, consisting of the radial slots, and prevent the fluid from flowing towards the center of the inside sleeve and therefore immediately build up a pressure;

Figure 10 is a small detail showing the section of the piston rod against the brake control lever; also a section of the foot pedal and its connection with the controlling valve;

Figure 11 is a similar view to Figure 10, except it shows the foot control pedal depressed into position to rock the controlling valve sufficiently to close the circulation and build up a pressure;

Figure 12 is a detail section on the line 12—12 of Figure 10, looking in the direction of the arrow, and shows the manner of mounting the brake control lever and the foot pedal on the rock shaft;

Figure 13 is a detail section on the line 13—13 of Figure 11 and shows the manner of mounting the brake control lever with the foot pedal and the adjustable spring tension device;

Figure 14 is a detail section showing the space around the controlling valve.

In the drawing, 2 represents an ordinary motor car transmission case, having the usual bell fly-wheel housing 3 and gear shift lever 4; also the clutch control rod 5 and the brake control rod 6. 7 shows the usual propeller shaft coupling mounted in the usual manner.

Between the end of the transmission case and the propeller shaft coupling I mount a suitable pump housing 8 secured to the transmission case by suitable bolts 9. Within the pump housing 8, I provide a pair of gears 10 and 11, the gear 10 being mounted on the transmission shaft 12, being free to slide parallel with the transmission shaft over the sleeve 13, but caused to revolve with the transmission shaft through the action of the key 14.

The sleeve 13 also acts as a spacer and is adapted to bear against the roller bearing 15 and being held in position firmly by the propeller shaft coupling 7 through the usual washer and cap screw 16.

The lower gear is mounted to revolve on a hollow stud 17 formed from the wall 18 of the pump housing 8.

Looking at Figure 7, it will be noted that the pump gear 10, mounted on the transmission shaft, will revolve counter-clockwise when the vehicle is traveling forward. Its co-acting member 11 will, of course, revolve in the opposite direction. It thereby follows that the fluid will be drawn into the pump gears through the port 19 along the passage 20 and delivered into the chamber 21, where it will pass through the slots 22 in the outer valve sleeve and 23 in the inner valve sleeve into the center 24 of the valve, then into the passage 25 and the outlet port 26 which leads back to the transmission case.

The outer valve 27, which contains the radial slots 22, is controlled by a short arm 28 secured in position by a key 29, and the inner valve 30 is controlled by a short arm 31 secured by a pin 32 to the valve 30. The stem of the valve 30 is made somewhat smaller at the point 33 than the inside of the part 34 of the valve 27 to prevent binding and facilitate manufacturing.

In order to provide an outlet for any fluid that may pass the valve 27 at the point near the slots 22 and therefore build up a pressure along the part 34, I provide suitable outlet holes 35 in the valve 27, and suitable holes 36 in the valve 30, so that this pressure may drain into the transmission case along with the normal circulation of the fluid.

Figure 1:
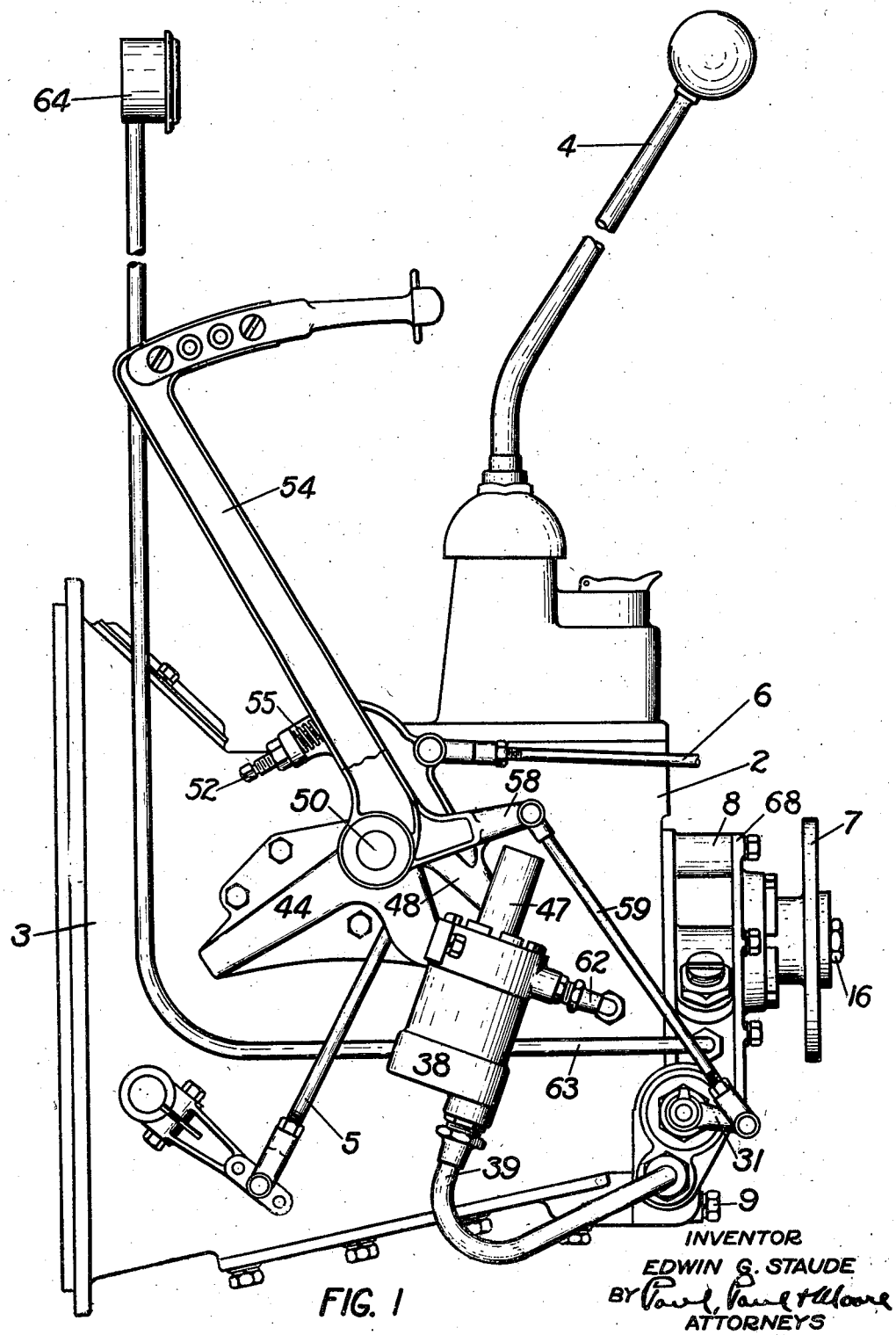
Figure 1 is a side view of an automobile transmission case embodying the invention, with clutch pedal broken away.
Figure 2:
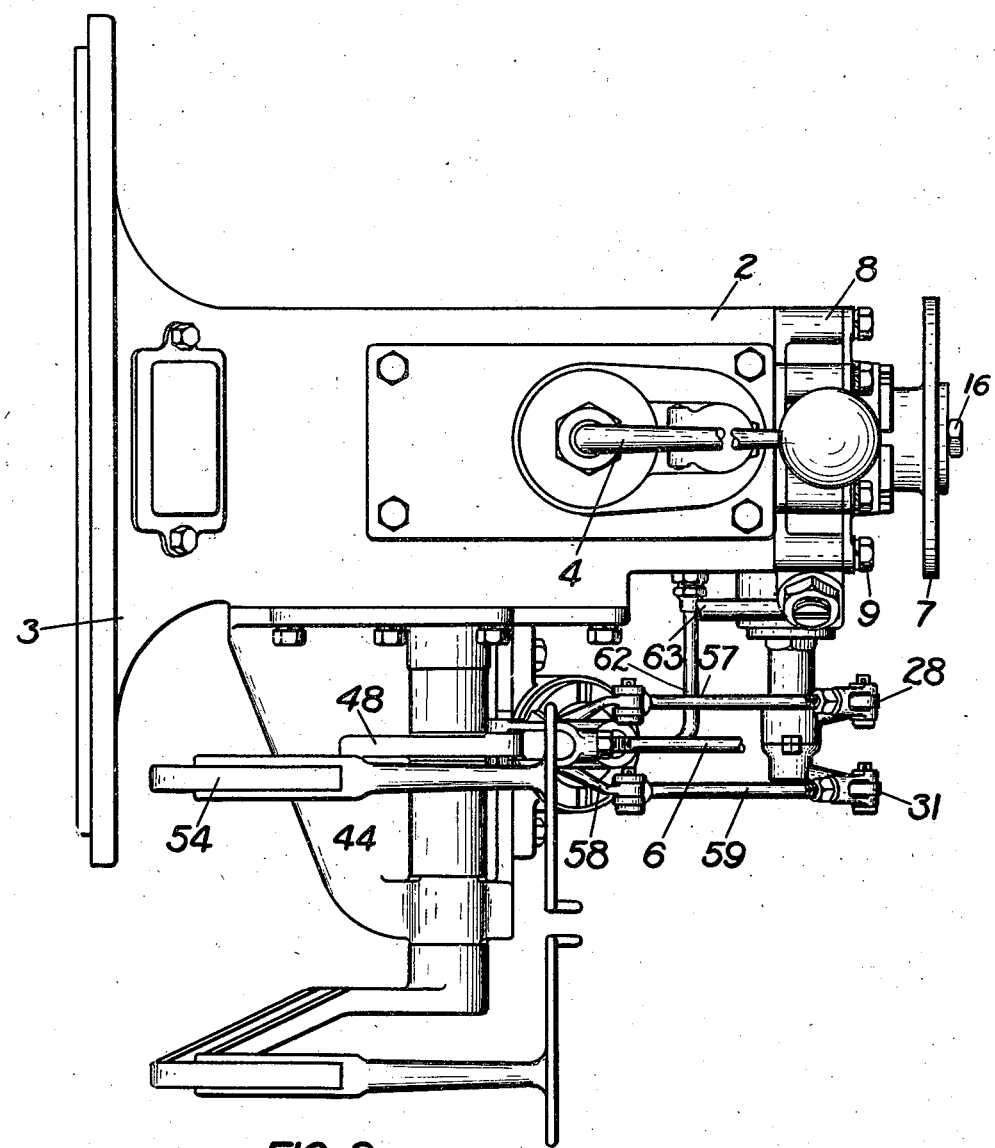
Figure 2 is a top view of Figure 1.

The chamber 21 communicates with the chamber 37, and as the pressure is built up in the chamber 21 through the closing of the valve ports 22 and 23, it will also build up in the chamber 37 and communicate with the cylinder 38 through a pipe 39, (see Figures 1 and 7). Excessive pressure will pass out through the hole 40 (see Figure 7) against the plunger 41 and the tension of the spring 42 and out through the hole 43, which communicates with the transmission case.

The cylinder 38 is mounted on the brake and clutch pedal bracket 44, (see Figure 1), and is provided with a piston 45 and a piston rod 46, which operates in suitable guides 47, and is adapted to be bear against an actuating brake control lever 48, (Figures 10 and 11).

The usual brake linkage rod 6 is connected to the brake control lever 48 at the point 49. The brake control lever is mounted on the usual pedal rock shaft 50 and has an L shaped projection 51 in which an adjustable set screw 52 is provided with a locknut 53 and adapted to regulate the movement of the end of the set screw 52 and the underside of the brake foot pedal 54. A spring 55 keeps the brake lever normally in the forward position with reference to the brake foot pedal.

Mounted on the brake control lever 48, is an arm 56. (See Figures 11 and 12.) The arm 56 is connected by a suitable rod 57 having forked end connections with the arm 28 on the valve 27.

A similar arm 58 is provided on the brake foot pedal 54 and it in turn is connected by a rod 59 connected at one end with the arm 58 and the other with the arm 31 on the valve 30.

A lug 60 is formed on the arm 48 and adapted to bear against the underside of the arm 58 of the brake foot pedal 48, being kept in contact therewith by the spring 55, Figure 11.

A port 61 is provided at the upper end of the cylinder 38 to provide an outlet for the air ahead of the piston so it will not be compressed as the piston 45 travels upward when fluid pressure is exerted against it.

A suitable pipe 62 is secured to the cylinder 38 and connected with the transmission case 2 above the fluid level therein, so that as the piston returns to its normal position it will draw in air from the transmission case that is free from dirt and grit, (Figure 1). A suitable tube 63 connects with the chamber 21 (Figure 7) and at its opposite end is provided a pressure gauge 64 which determines the amount of pressure in the chamber 21, (Figure 1).

To provide an air-tight seal on the open side of the pump housing and still permit the use of ordinary packing, I provide a plate 65 of sufficient thickness to fit in the recess 66 and flush with its outer edge, so that the usual packing 67 may be provided over the entire surface, and with the cap 68 held in position by the bolts 9, I am able to secure a tight joint, regardless of the variation in the packing 67, and maintain a uniform space for the gears 10 and 11, (Figures 6 and 7).

The usual packing 69 and the gland 70 serve to prevent the flow of fluid out over the propeller shaft, causing it to flow back into the transmission case by following through one of the splines on the transmission shaft.

Figure 5:
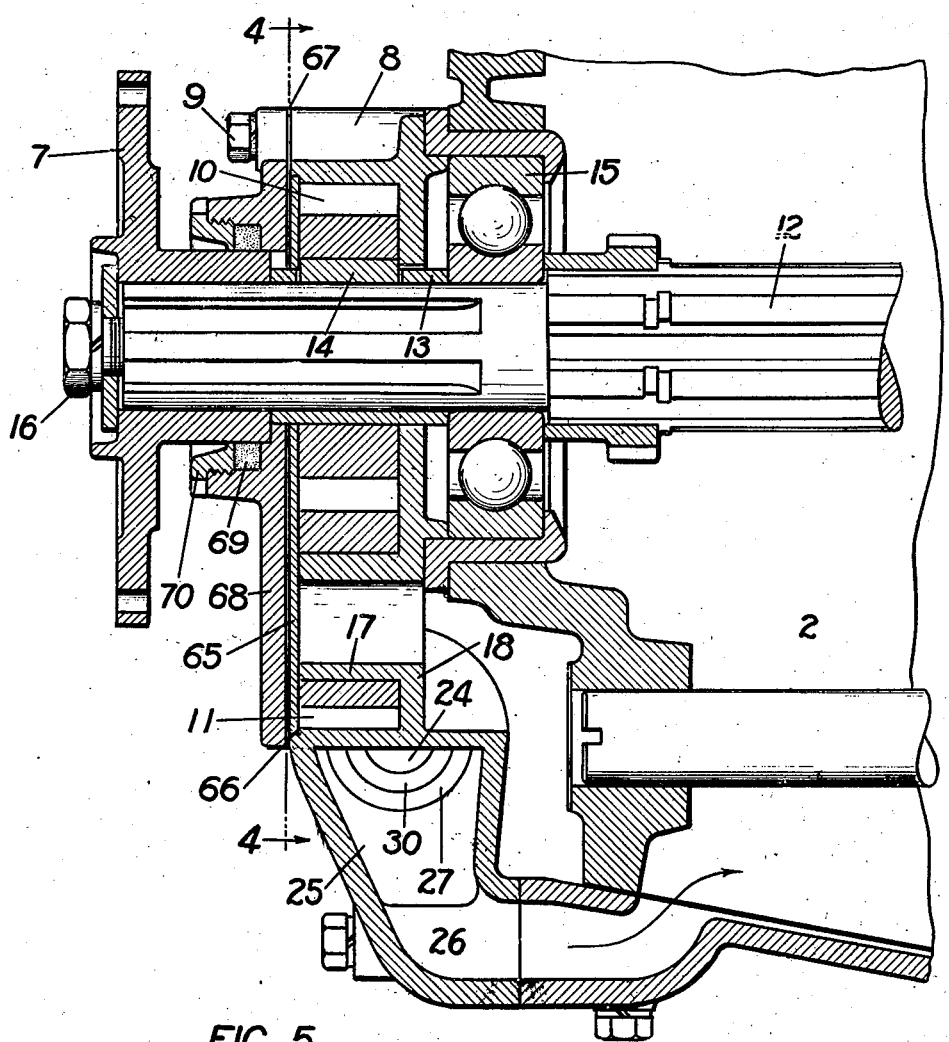
Figure 5 is a section of the rear of the transmission case to which my invention has been applied, the section being substantially on the line 5—5 of Figure 7.

Normally the pump gears 10 and 11 cause a circulation of the fluid by drawing in the fluid from the transmission case, (see Figure 6), through the port 19, along the channel 20, (see Figure 7), and deliver the fluid into the chamber 21, causing it to pass through the radial valve ports 22 and 23 and out through 24 and into the chamber 25 and back into the transmission case through the port 26 (see Figure 5).

When the brake foot pedal 54 is depressed slightly, it will compress the spring 55 until the set screw 52 comes in contact with the foot brake pedal 54, (see Figure 13), and when the foot brake pedal 54 is in this position the arm 58 through the rod 59 will rock the lever 31 and through it the valve 30 closing off immediately all of the circulation and instantly building up a pressure in the chambers 21 and 37.

As the pressure is built up in the chamber 37 it will flow out through the tube or pipe 39 and into the cylinder 38 and actuate the piston 45, moving the piston rod 46 up in the guide 47 and rocking the brake arm 48, which will pull on the brake rod 6 through its connection at the point 49.

As soon as this action takes place it will also through the arm 56, which is part of the brake arm 48, cause the valve arm 28 to rock through its being connected with the arm 56 by the rod 57, and when the arm 28 is rocked, it will in turn rock the valve 27 and cause the ports 22 and 23 to again register open with each other and immediately permit the fluid to flow through the valves into the spaces 24, 25 and 26, releasing the pressure.

As soon, however, as the foot pedal 54 is again further depressed, a repetition of the cycle of movements just described will again take place.

The action of these pressures is so rapid it will be practically instantaneous and therefore follow the foot brake as the brake is applied and carry the load up to the point that the foot pedal 54 is depressed. Should, of course, for any reason the pump gears not be supplied with fluid through the port 19 from the transmission case 2, then, no pressure could be set up in the chamber 21 or the chamber 37 and no pressure would actuate the piston 45. In that case, the foot pedal being depressed against the set screw 52, it would then pick up the brake arm 48 and through its connection with the rod 6 manipulate the brakes in the usual manner, entirely through physical effort.

Through the proper adjustment of the set screw 52 in the brake arm 48, the ports 22 and 23 in the controlling valve may be adjusted to close entirely or only partly, thereby regulating the amount of pressure desired on the piston 45, irrespective of the by-pass valve 41, and thus the brake control may be made to carry the entire load or only a part, leaving the balance for the foot brake pedal 54.

I claim as my invention:

1. A brake control for power propelled vehicles comprising a foot pedal having a brake connection, a pump having a fluid circulating system, means for operating said pump, normally open means for obstructing the flow of fluid in said circulating system to generate a pressure therein, mechanism for closing said means by the movement of said foot pedal to generate such pressure and actuate said brake connection, and means operative by the formation of such pressure for operating said obstructing means to relieve the pressure in said system.

2. A brake control for power propelled vehicles comprising a foot pedal having a brake connection, a pump having a fluid circulating system and means for operating said pump, a pair of concentric rotatable sleeve valves in said circulating system and having ports therein adapted to be opened and closed by the rotation of said valves, one of said valves having means actuated by said foot pedal for closing said ports to create a pressure in said circulating system, and the other of said valves having means actuated through the formation of such pressure for opening said ports to release the pressure.

3. A brake control for power propelled vehicles comprising a foot pedal having a brake connection, a pump having a fluid circulating system, and having means for connection with the vehicle transmission shaft and adapted to be driven by the motion of the vehicle when the motive power is inoperative or the clutch or transmission gears are disengaged, a pair of concentric rotatable sleeve valves in said circulating system having ports adapted to be opened and closed by the rotation of said valves and regulate the flow of fluid through said system, one of said valves having means adapted to be operated by the foot pedal for closing said ports and forming a pressure in said system, the other valve having means actuated by such pressure for opening the ports of said valves to release the pressure.

4. A brake control for power propelled vehicles comprising a foot pedal having a brake connection, a pump having a fluid circulating system, means for operating said pump, a pair of concentric rotatable sleeve valves in said system having ports for the passage of the fluid therethrough, one of said valves having means adapted to be operated by the foot pedal for closing said ports and generating a pressure in said system, the other valve having mechanism actuated by such fluid pressure for opening said ports to release the pressure, and said foot pedal and its brake connection having means for normally holding said valves in the open position of said ports.

5. A brake control for power propelled vehicles comprising a foot pedal having a brake connection, a pump having a fluid circulating system, means for operating said pump, a pair of concentric rotatable sleeve valves in said system having ports for the passage of the fluid therethrough, one of said valves having means adapted to be operated by the foot pedal for closing said ports and generating a pressure in said system, the other valve having mechanism actuated by such fluid pressure for opening said ports to release the pressure, and said foot pedal and its brake connection having means for normally holding said valves in the open position of said ports, said means including a yielding device between said foot pedal and said brake connection.

6. A brake control for power propelled vehicles comprising a foot pedal having a brake connection, a pump having a fluid circulating system, means for operating said pump, valves in said system having ports therein for the passage of the fluid therethrough and adapted for adjustment to create or release a pressure in said sytem, yielding means adapted to hold said valves normally in their open port position and adapted to close said ports upon the initial movement of said pedal to create a pressure in said system, a cylinder connected with said system and having a piston actuated by such pressure, and means operated by the movement of said piston for opening the ports of said valves to release the pressure.

7. A brake control for power propelled vehicles comprising a foot pedal having a brake connection, a pump having a fluid circulating system and means for operating said pump, a pair of concentric rotatable sleeve valves in said system having ports therein adapted to be opened and closed by the rotation of said valves for regulating the flow of fluid in said system, mechanism actuated by the initial movement of said pedal for rotating one of said valves to close said ports and create a pressure and actuate said brake connection, and means operated by said mechanism through the generation of the pressure in said system for rotating said other valve to open said ports.

8. A brake control for power propelled vehicles comprising a foot pedal having a brake connection, a pump having a fluid circulating system and means for operating said pump, the intake of said pump having means for connection with the transmission case and the exhaust of said pump also having means for connection with the transmission case, a pair of concentrically arranged rotatable sleeve valves in said system having ports therein for the passage of fluid therethrough, said valves being normally in the open position of said ports, means actuated by the movement of the foot pedal for rotating one of said valves to close said ports and create a pressure in said system, and mechanism actuated through the formation of such pressure for rotating said other valve to open said ports and release the pressure.

9. A brake control for power propelled vehicles comprising a foot pedal having a brake connection, a pump having a fluid circulating system, means for operating said pump, a pair of concentric rotatable sleeve valves, each having elongated ports adapted to register and permit the flow of fluid through said system, one of said valves having means adapted to be actuated by the foot pedal for rotating it to close said ports, the other valve having means actuated by such fluid pressure for opening said ports to relieve the pressure, and a by-pass valve for limiting the maximum pressure on the exhaust side of said pump.

10. A brake control for power propelled vehicles comprising a foot pedal having a brake connection, a pump housing and a pair of pump gears therein, a transmission shaft whereon one of said gears is mounted, said pump housing having a projection thereon adapted to form a bearing for said other pump gear, a fluid circulating system for said pump, valves having ports in said system for the flow of fluid therethrough, and mechanism for operating said valves successively to close and open said ports.

11. A brake control for power propelled vehicles comprising a foot pedal having a brake connection, a pump having a fluid circulating system, means for operating said pump, a valve structure in said fluid system having ports adapted to be closed or opened to create a pressure in said system or release the same, mechanism actuated by the fluid pressure when said valve ports are closed and the flow of fluid is obstructed to assist said brake pedal in carrying the braking load, and means in connection with said mechanism for operating said valve structure to open said ports and release the obstructed fluid, the degree of movement of said fluid pressure actuated means being dependent upon the degree of movement of said foot pedal.

12. A brake control for power propelled vehicles comprising a brake rod actuating mechanism, a fluid pressure pump and a circulating system therefor, a valve in said system adapted to check the flow of fluid from the exhaust side of said pump and thereby set up a pressure in said system, means connected with said valve and having a yielding connection with said brake rod actuating mechanism for closing said valve upon the initial movement of said brake rod actuating mechanism, and mechanism actuated by the fluid pressure in said system for releasing such pressure on the exhaust side of the pump upon moving a predetermined distance.

13. The combination with a transmission casing having a pump housing and pump therein, and a fluid circulating system communicating with said casing and with said pump, concentric rotatable valves having ports adapted to register and permit the flow of fluid in said system, said valves being mounted for relative rotary movement to close or open said ports, a foot pedal having a direct connection with one of said valves and a yielding brake rod connection, the initial movement of said pedal operating its valve to close the ports therein and create a pressure in said system, a cylinder connected with said system and having a piston to be actuated by such pressure, means for transmitting the initial movement of said piston to said brake rod connection and operating said other valve to release the pressure in said system.

14. A brake control for power propelled vehicles comprising a pump having a fluid circulating system, a valve structure in said system for checking the flow of fluid therethrough to create a pressure or release the fluid to reduce such pressure, a foot pedal having means for connection with said valve structure to move it to its closed position upon initial movement of said pedal, a brake arm having a brake rod connection, yielding means between said brake arm and said pedal whereby said brake arm will be inactive upon the initial movement of said pedal, and mechanism actuated by the pressure set up in said system through the closing of said valve to return said valve to its open position and release the pressure.

15. A brake control for power propelled vehicles comprising a foot pedal, a pump having a fluid circulating system, rotating concentric valves in said system having ports therein adapted to be closed and opened by the movement of said valves to set up a pressure in said system or release the same, a brake arm having a brake rod connection and a yielding connection with said pedal for taking up the initial movement of said pedal, means connecting said valves respectively with said pedal and with said brake arm, the initial movement of said pedal operating one of said valves to close the ports and generate a pressure in said system, a cylinder connected with said system and having a piston therein adapted to actuate said brake arm upon the creation of pressure and the movement of said piston and operate said brake rod connection, the movement of said brake arm through its connection with the other valve opening the ports therein to release the pressure in said system.

16. In a device of the class described, a transmission case, a pump housing secured thereto, a transmission shaft, a propeller shaft coupling, a spacer sleeve on said transmission shaft, gears in said housing, one of them being adapted to slide on said sleeve and held to revolve with said transmission shaft, a roller bearing against which said spacer sleeve is seated and held by said propeller shaft coupling, a circulating system for said pump gears, means for creating a pressure on the exhaust side of said pump gears, and a foot pedal having a brake connection adapted to be operated through the creation of pressure in said system.

17. A brake control for power propelled vehicles comprising a lever having a brake connection, a pump having a fluid circulating system and means for operating said pump, relatively movable and cooperable valves in said circulating system having a port adapted to be opened and closed by the movement of said valves, one of said valves having means actuated by said lever for closing said port to create a pressure in said system, and the other of said valves having means actuated through the formation of such pressure for opening the port to release the pressure.

18. A brake control for power propelled vehicles comprising a pump having a fluid circulating system, a valve structure in said system for checking the flow of fluid therethrough to create a pressure or to release the fluid to reduce such pressure, a lever having means for connection with said valve structure to move it to its closed position upon initial movement of said lever, a brake arm having a brake rod connection, yielding means between said brake arm and said lever whereby said brake arm will be inactive upon the initial movement of said lever, said brake arm being adapted to hold said lever with a yielding pressure, and mechanism actuated by the pressure set up in said system through the closing of said valve structure to move it to its open position and release the pressure.

19. A brake control for power propelled vehicles comprising a lever having a brake connection, a pump having a fluid circulating system, and means for operating said pump, concentric valves in said circulating system having a port therein adapted to be opened and closed by the movement of said valves, one of said valves having means actuated by said lever for closing said port to create a pressure in the circulating system, and the other of said valves having means actuated through the formation of such pressure for opening the port to release the pressure.

20. A braking system including a lever, a piston cooperative with the lever, a pump having a circulating system and a valve structure having cooperable elements separately movable to open and close to vary the pressure in the circulating system, conduit connections with the pressure side of the pump for operating said piston, and connections between the elements of the valve structure, and lever for operating said valve elements for building up and then releasing braking pressures as the system is operated.

21. A circulating system and pump therefor, valves arranged in circulating system, a foot pedal connected to one of said valves so that the valve is moved to closing position when the pedal is moved to braking position, a brake lever connected to the other valve in a manner to move it to open position when said lever moves to braking position, and means operable as result of pressure built up by the cooperable closing of both valves for urging said brake lever to braking position.

In witness whereof, I have hereunto set my hand this 14th day of May, 1925.

EDWIN G. STAUDE.